July 14, 1964

T. C. PRESTON ETAL 3,140,904

TOWEL DISPENSING APPARATUS

Filed April 24, 1963

Inventors
Troy C. Preston
Justin J. Wetzler
Stanley Tyburski
By George E. Frost - Keith J. Kulie
Attorneys

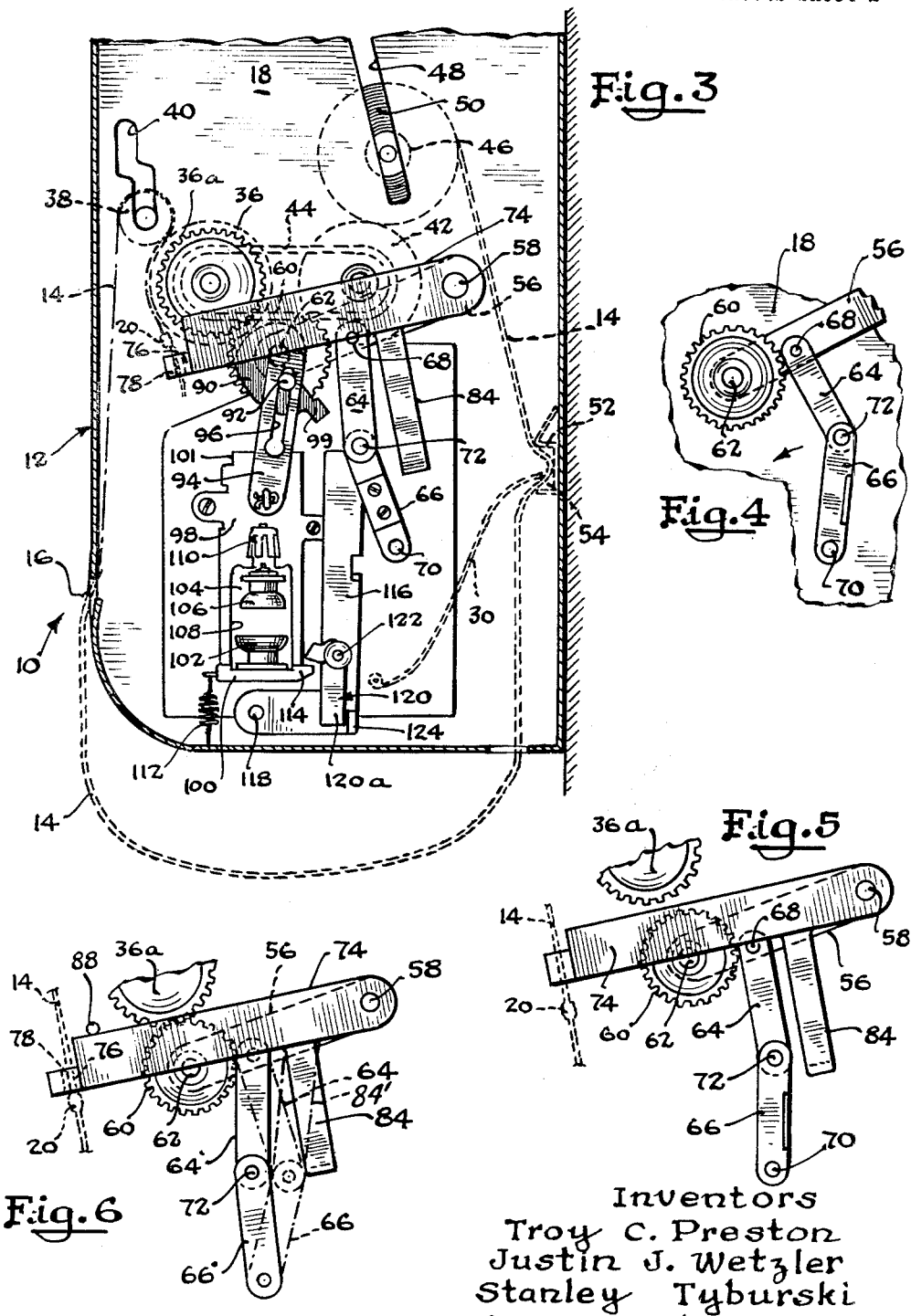

July 14, 1964     T. C. PRESTON ETAL     3,140,904
TOWEL DISPENSING APPARATUS
Filed April 24, 1963     5 Sheets-Sheet 3
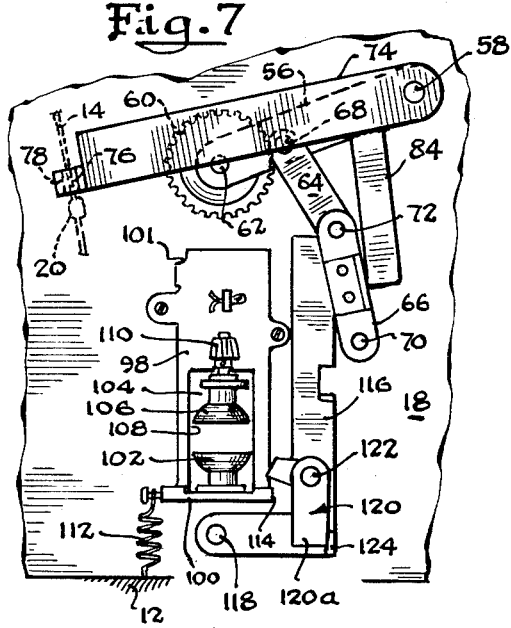
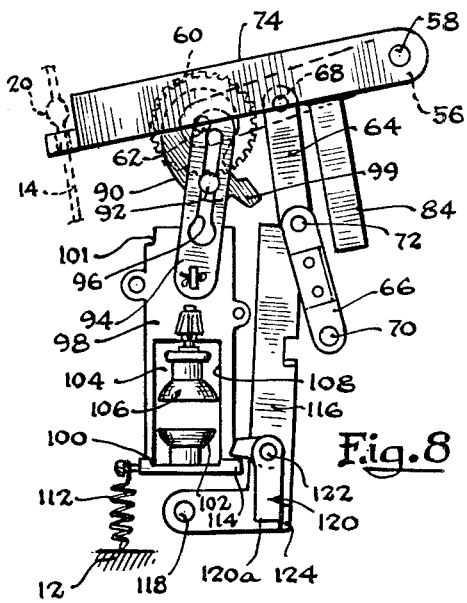
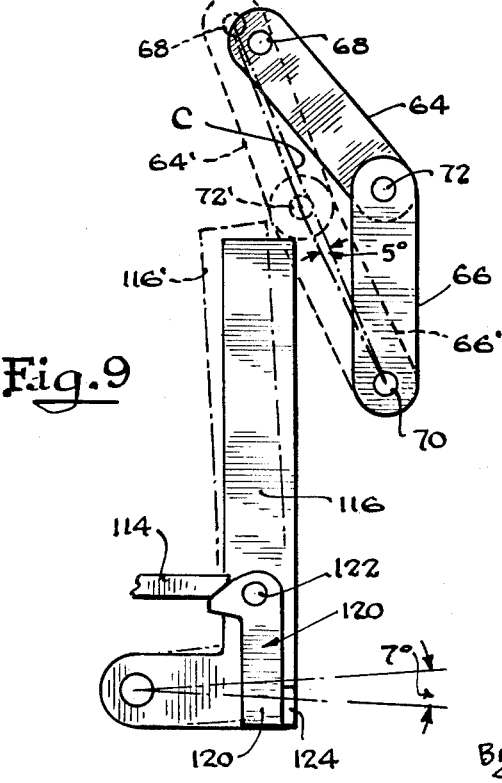
Inventors
Troy C. Preston
Justin J. Wetzler
Stanley Tyburski
By George E. Frost—Keith J. Kulie
Attorneys July 14, 1964
T. C. PRESTON ETAL
3,140,904
TOWEL DISPENSING APPARATUS
Filed April 24, 1963
5 Sheets—Sheet 4
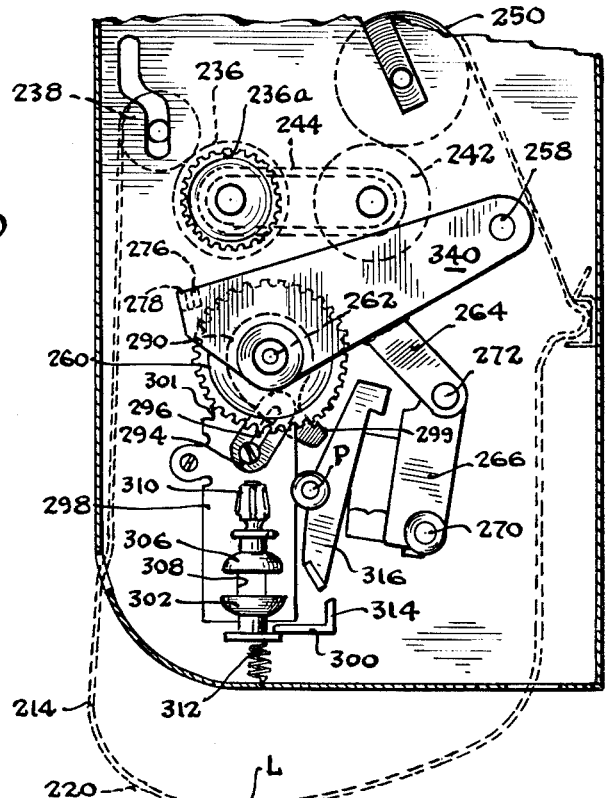
Fig.10
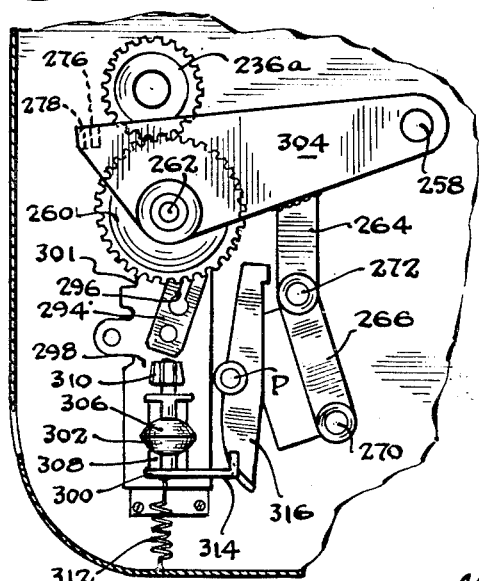
Fig.11
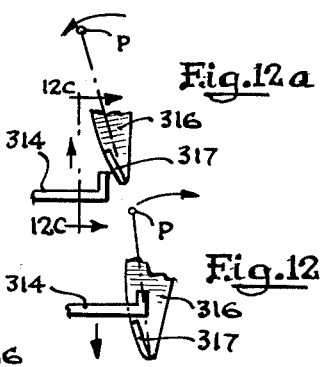
Fig.12a
Fig.12b
Fig.12c
Inventors
Troy C. Preston
Justin J. Wetzler
Stanley Tyburski
By George E. Frost — Keith J. Kulie
Attorneys July 14, 1964
T. C. PRESTON ETAL
3,140,904
TOWEL DISPENSING APPARATUS
Filed April 24, 1963
5 Sheets-Sheet 5
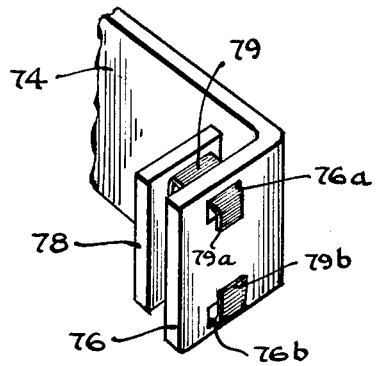
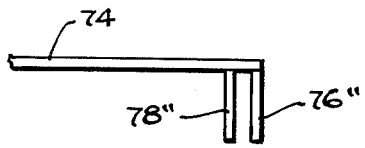
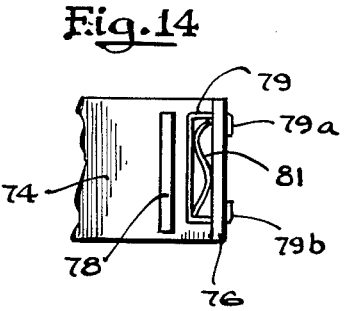
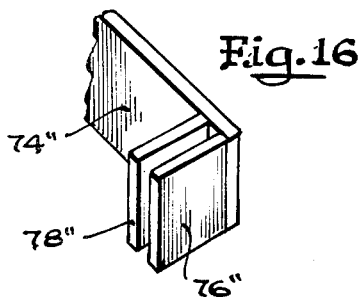
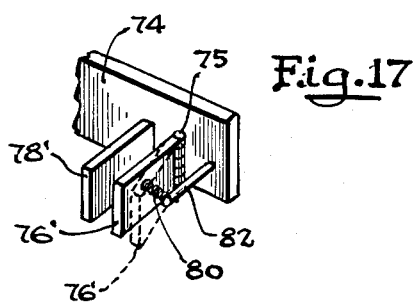
Inventors
Troy C. Preston
Justin J. Wetzler
Stanley Tyburski
By George E. Frost - Keith J. Kulie
Attorneys

United States Patent Office 3,140,904
Patented July 14, 1964

3,140,904
TOWEL DISPENSING APPARATUS
Troy C. Preston, Mount Carroll, Justin J. Wetzler, Evanston, and Stanley Tyburski, Homewood, Ill., assignors to F. W. Means & Co., Chicago, Ill., a corporation of Illinois
Filed Apr. 24, 1963, Ser. No. 275,322
14 Claims. (Cl. 312—38)

The present invention relates to a continuous towel dispensing apparatus and more particularly it relates to an improved towel actuated means for regulating the towel discharge and assuring the user that he is using fresh toweling.

Continuous towel dispensing apparatus and the toweling used therein has heretofore provided no way to distinguish the toweling that has been used and soiled from fresh, unused toweling. Typically, the dispensing apparatus releases (under the pull of the user) a predetermined length of toweling, at which time the dispensing unit locks to prevent further towel withdrawal. After the lock is released by the passage of time or otherwise, further withdrawal of toweling is permitted.

Without visual or other means to know that a particular section of toweling is indeed fresh, the user of the prior apparatus may be uncertain whether he is or is not using fresh toweling. To be sure that the toweling is indeed fresh, he follows the natural inclination to withdraw a new length of toweling. While this provides the certainty desired by the user, it frequently wastes the toweling. And even if this does not always happen, the customer for the continuous toweling may feel that unnecessary use is taking place and that the cost of the toweling is more than it need be.

In accordance with the present invention, the toweling itself serves, in whole or in part, as the means to limit the amount withdrawn at any other time. With the toweling itself serving as the means to identify the fresh lengths, it is possible to apply indicia by printing or otherwise to assure to the user that he is indeed using a fresh panel of the towel length and thereby avoid the unnecessary withdrawal of toweling that otherwise might occur. In addition the customer for the continuous toweling has an assurance that unnecessary use is not taking place.

It is, accordingly, a general object of the present invention to provide an improved towel-actuated towel dispensing apparatus.

A further object of the present invention resides in the provision of an improved towel-actuated towel dispensing apparatus in which delineation means on the towel is used in cooperation with the apparatus to designate the clean towel areas from the soiled towel areas.

An additional object of the apparatus of the present invention resides in the provision of a dispensing apparatus having means operatively engaged by passage of delineations upon the towel employed in the apparatus to arrest further towel withdrawal.

Still another object of the present invention resides in the provision of an improved towel dispensing apparatus having automatic towel discharge apparatus with towel stop means actuated by means on the toweling withdrawn from the apparatus.

A further object of the present invention is to provide an improved towel dispensing mechanism in which means on the towel itself triggers the measuring action to dispense a measured quantity of toweling determined by both the towel and the apparatus.

Still another object of the present invention is to provide an improved towel dispensing mechanism having releasible catch elements responsive to withdrawal of toweling that serve, in response to predetermined towel movement, to condition the towel dispensing mechanism to dispense a predetermined further quantity of toweling.

An additional object of the present invention is to provide an improved towel dispensing mechanism and toweling for use therewith in which movable catch elements are momentarily actuated by towel withdrawal to initiate towel-measuring action and thereby provide a predetermined quantity of toweling.

Another object of the present invention is to provide an improved towel dispensing mechanism and toweling for use therewith in which markings that are both visible to the user and sensed by the mechanism serve to identify successive panels of toweling, and wherein, upon predetermined withdrawal of the toweling the mechanism senses that markings to be conditioned to dispense a predetermined further quantity of toweling and towel movement arrest takes place after the marking has been drawn to a point of visibility.

Yet another object of the present invention is to provide an improved apparatus for dispensing continuous toweling in measured lengths and capable of dispensing different lengths without alteration of the dispensing mechanism.

Still another object resides in the provision of an improved continuous towel dispensing apparatus having improved operating means in combinations with triggering means that is economical to manufacture, easy to use, durable in use, and positive in towel dispensing sequencing whereby successive towel lengths are delivered from the apparatus.

The novel features which are believed to be characteristic of the present invention are set forth with particularity in the appended claims. The invention itself, however, together with further objects and advantages thereof, will best be understood by reference to the following description taken in conjunction with the accompanying drawings, in which:

FIGURE 3 is a side view of the apparatus of the present invention taken along lines 3—3 of FIGURE 1 showing the operating means associated with the towel dispensing apparatus including the towel cabinet triggering means;

FIGURE 4 is a fragmentary view of the movable operating gear and associated crank arm and movable joint of the operating apparatus for the towel dispenser;

FIGURE 5 is a view of the apparatus of FIGURE 4 illustrating the triggering arm associated therewith;

FIGURE 6 is a view of the apparatus of FIGURE 5 showing the apparatus in alternate positions;

FIGURE 7 is a view of the complete operating means structure of hte towel dispensing apparatus;

FIGURE 8 is a view of the operating means of the apparatus of the present invention with the timing means of the apparatus in the active towel-releasing position;

FIGURE 9 is a view of one form of the movable joint member and the reset means therefor;

FIGURE 10 is a fragmentary view of the towel cabinet similar to the cabinet view of FIGURE 3 illustrating a modified timing apparatus for the towel dispenser;

FIGURE 11 is a view of the apparatus of FIGURE 10 illustrating positioning of the apparatus after the timing means have been triggered by the withdrawal of toweling from the cabinet;

FIGURE 12a is a fragmentary view of the reset means for the timing apparatus showing the action of the reset arm and cam to move the reset arm away from the movable joint arms of the timing apparatus;

FIGURE 12b is a fragmentary view of the reset means of FIGURE 12a showing the reset feature where the reset cam moves the reset arm to reposition the movable joint arms of the timing apparatus; and FIGURE 12c is a view of the mating portions of the reset cam and arm taken along lines 12c—12c of FIGURE 12a.

FIGURE 13 is an enlarged fragmentary view, in perspective, from the side of the towel ridge engaging means of the towel discharge regulating apparatus;

FIGURE 14 is a side elevation of the means of FIGURE 13 illustrating the same portion of the apparatus;

FIGURE 15 is a fragmentary enlarged top view of a modified form of the trigger apparatus illustrating the magnetic bar or member employed in combination with the magnet disposed within the toweling to be used in the cabinet;

FIGURE 16 is an enlarged fragmentary view in perspective of the apparatus of FIGURE 15 illustrating the same portion of the apparatus;

FIGURE 17 is a fragmentary enlarged view in perspective from the side of still another modification of the trigger means of the towel discharge regulating apparatus; and FIGURE 18 is a fragmentary view of the apparatus of FIGURE 1 showing the use of the toweling with a seam extending partially across the width of the towel.

Figure 1:
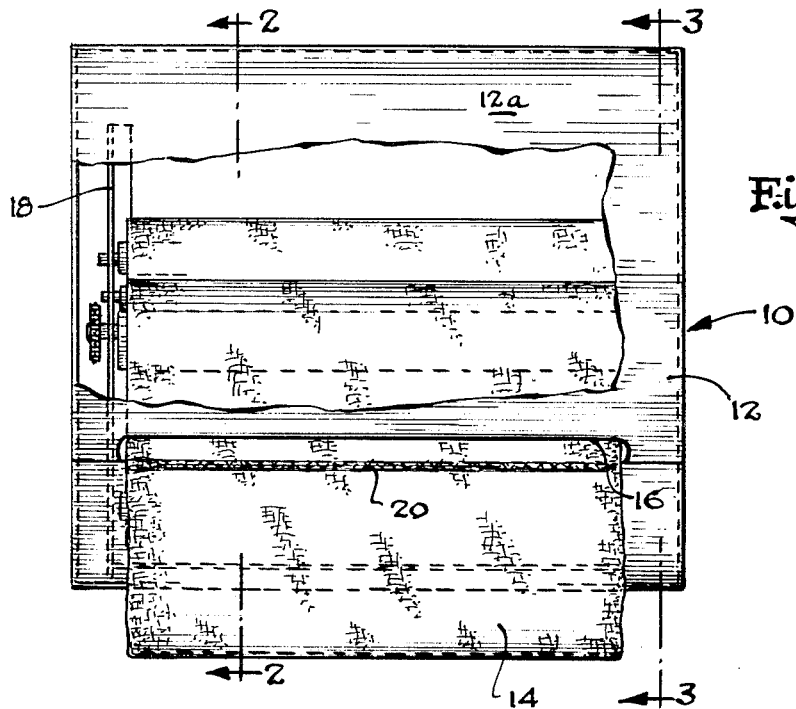
FIGURE 1 is a front elevational view of the towel dispensing apparatus of the present invention partly broken away to show the towel within the cabinet.
Figure 1A:
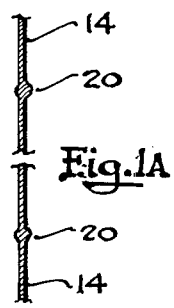
FIGURE 1a is a fragmentary enlarged longitudinal cross section view through the toweling employed in combination in the apparatus of the present invention.

Referring more particularly now to FIGURE 1 of the drawings the towel dispensing apparatus is indicated generally at 10. A cabinet 12 is provided to support the clean and soiled toweling and the operating mechanism for dispensing the apparatus. The toweling 14 extends from the cabinet 12 through the opening 16 provided in the front wall of said cabinet. The soiled toweling 14, after use, is withdrawn into the cabinet 12 and rerolled upon the roller 46 provided therefor ready for removal and replacement when all of the toweling 14 has been used. Support plates 18 are provided in the cabinet 12 along both side walls thereof for the operating mechanism and dispensing apparatus disposed therein.

As shown in FIGURES 1 and 18, the continuous roll of toweling 14 employed in combination in the cabinet 12 of the present invention may be provided with seams 20 or 20' extending transversely at spaced intervals along the length of the towel. The interval between each successive seam defines the desired towel area to be presented for each user. These areas may, for example, be about 8 inches in length, although longer seam spacings may be used, if desired. The successive seams serve to arrest the towel withdrawal temporarily as is described in detail hereinafter.

Figure 1B:
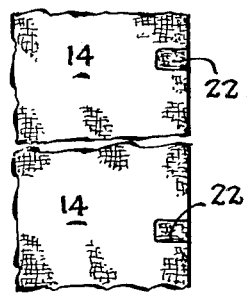
FIGURE 1b is a fragmentary view of a modified form of the toweling of FIGURE 1a wherein longitudinally spaced magnet elements are provided along the margin of the toweling.

FIGURE 1b shows an alternative means of identifying successive lengths of towel. In this arrangement, magnet bars 22 are affixed to the margin of the towel, or, if desired, both margins. These are spaced by the amount of towel desired to be withdrawn and serve to arrest towel withdrawal as hereinafter described in detail.

It should be observed that in conventional continuous towel cabinet construction the timing apparatus is of fixed design and adapted to release only a predetermined length of towel for each successive towel movement. In order to vary the length of toweling released it is necessary to modify the cam mechanism of the timing apparatus or to vary the roll diameter of the rolls associated with the timing mechanism. The desired variation, no matter how it is achieved, requires mechanical modification of the operating apparatus of the dispensing cabinet. The apparatus set forth herein is adapted for variation to discharge any predetermined towel length by varying the triggering means for the timing apparatus, in this apparatus the triggering means being the continuous toweling.

Hinge brackets 24 are pivotally connected to the side walls of the cabinet 12 by the pin 26. The brackets 24 permit pivoting of the cover portion 12a of the cabinet to permit access to the soiled and clean towel storage and feed areas for servicing of the cabinet.

Figure 2:
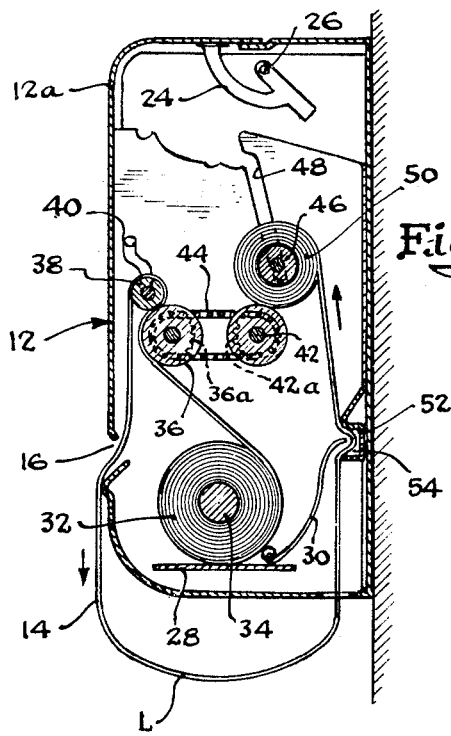
FIGURE 2 is a side view in section taken along lines 2—2 of FIGURE 1.

A roll support table 28 is rigidly affixed adjacent the lower portion of the cabinet 12 as indicated in FIGURE 2. A smoothing baffle 30 is affixed to the support table 28 for the function to be noted hereinbelow.

The clean towel roll 32, which is rolled on the spindle 34, rests on the table 28 of the cabinet, as indicated in FIGURE 2. The web or continuous towel 14 is unwound from the roll 32 and extends about one-third turn around the drive roll 36 which drive roll is mounted in fixed axial position by means of suitable shaft receiving openings in the side plates 18 of the cabinet 12. The pinch roll 38 is movably mounted in the side plates 18 of the cabinet 12 by reason of the vertically elongated slots 40 which receive the extending shaft portions of the pinch roller and allow said roller to move freely down to pinch the towel 14 on the roll 36 of the dispensing apparatus. It should be observed that downward pull on the toweling 14 in the portion extending from the cabinet 12 serves to pull the pinch roller 38 into tight engagement with the drive roll 36 of the apparatus.

The towel dispensing operating means includes a take-up roller 42 which is mounted in fixed axial position between the side plates 18 in suitable openings therein which receive the extending shaft portions of this roller. The roller 42 is rotated in unison with the roller 36 by means of the chain 44. The chain 44 is received on the sprockets 36a and 42a of the rolls 36 and 42, respectively. The used towel take-up core 46 has extending shaft portions which are received in the elongated slots 48 formed in the support plates 18. These slots permit the roll 50 on core 46 to move up and down to assure that the roll rests on the take-up roller 42 and can rise upwardly as toweling is wound upon the core 46 of said roll.

In operation, the user pulls down on the front exposed portion 14 of the towel, which action thereupon pulls the roll 38 to snug gripping engagement with the roll 36 and thereby positively drives the roll 36 in clockwise direction as shown in FIGURE 2 of the drawings. This rotates the take-up roll 42 in the same direction and amount by reason of the interconnection between rolls 42 and 36 with the chain 44 thereby rotating the soiled towel roll 50 in counterclockwise direction in FIGURE 2. Since the peripheral velocity of roll 36 is indentical with the linear velocity of the towel being withdrawn, and the peripheral velocity of roll 42—and hence the peripheral velocity of the soiled towel roll 50—is the same, the toweling is drawn up at exactly the same rate as it is withdrawn and the loop L formed by the towel 14 remains of the same size as originally provided when the toweling is installed in the machine.

A channel shaped cross member 52 extends crosswise between the sides of the cabinet 12 to form a U-shaped cavity 54 which receives the rearwardly extending end of the smoothing baffle 30. The baffle 30 is hingedly supported on the table 28 of the cabinet and is held against counterclockwise rotation when the cabinet is closed by suitable means (not shown) to smooth the towel in a fashion well known in the art.

The towel discharge regulating apparatus is shown in complete assembly in FIGURE 3 of the drawings. The construction and operation of the regulating apparatus, however, will best be understood by reference to FIGURES 4 through 9 of the drawings.

As illustrated in FIGURES 3 and 4 of the drawings, a pivot arm 56 is pivotally mounted to the cabinet wall 18 by the pivot pin 58. The free end of the pivot arm 56 carries the gear 60 which is rotatably affixed thereto by the gear shaft 62. Arms 64 and 66 are operatively associated with the pivot arm 56 of the regulating apparatus in the manner set forth hereinbelow. One terminal of the arm 64 is pivotally connected to the pivot arm 56 at a point on said arm 56 intermediate the terminals thereof by pivot pin 68. One terminal of the arm 66 is pivotally affixed to the cabinet wall 18 by the pivot pin 70. The free ends of arms 64 and 66 are mutually pivotally interconnected by pin 72 and are adapted to pivot in unison to define a floating toggle pivot joint. The cabinet support for the gear 60 thus is defined through arms 56, 64, and 66 to the pivot points on the cabinet wall 18 defined at 58 and 70.

A trigger arm 74 is pivotally mounted to the wall 18 of the cabinet by the pin 58 which also serves as a pivot mount for the arm 56 of the assembly. The free end of the arm 74 is provided with means releasably to engage the successive transverse seam 20 or 20′ of the toweling 14. As illustrated in FIGURES 13 and 14, the releasable means on the trigger arm 74 is defined by the spaced arms 76 and 78. The free terminal of the arm 74 is bent through 90° to define the arm 76 of the releasable means. Openings 76a and 76b extend through the arm 76, as illustrated. A generally U-shaped clip 79 is adapted to be affixed to the arm 76 in movable relation with respect thereto. The clip 79 is provided with ears 79a and 79b extending rearwardly therefrom and adapted to extend through the openings 76a and 76b of the arm 76. The ears 79a and 79b are folded over the back of the arm 76 to affix the clip 79 to said arm. A spring 81 is positioned between the base of the clip 79 and the inner face of the arm 76, as shown, said spring serving to bias the clip 79 away from the arm 76 in its relaxed position. The normal towel thickness handled in cabinets of the type set forth herein is approximately .020″ to .025″. Thus the clip 79, in the preferred embodiment should be urged to within .030″ of the arm 78 in the static position of said clip. The transverse seams 20 or 20′ of the towel 14 may, for example, be .060″ in thickness. It can readily be seen that the seam will not pass through the space defined between the arm 78 and the clip 79 when the spring is in its relaxed position. The detailed function of the trigger means is set forth hereinbelow.

Releasable trigger means of the type set forth in FIGURE 17 also may be employed in the apparatus set forth herein. In particular, the releasable means of FIGURE 17 is defined by spaced arms 76′ and 78′ affixed to the pivot arm 74 of the towel regulating means. One arm, indicated at 78, is rigidly affixed at 75 to the arm 74. A compression spring 80 is sandwiched between the arm 76 and the fixed backing post 82, the latter being rigidly supported by the arm 74 of the assembly, as shown. The spring 80 is adapted to urge the arm 76 toward the arm 78 to a distance sufficient to permit passage of the normal towel width of the toweling 14 but to releasably restrain passage of the towel seams 20 or 20′, as set forth hereinafter.

A further modification of the releasable element of the towel regulating means is illustrated in FIGURES 15 and 16. This modification, as illustrated is particularly suited for application in dispensing apparatus employing the toweling having magnets 22 extending at spaced intervals along the towel length. The releasable means includes spaced arms 76″ and 78″ both rigidly affixed to the free terminal of the arm 74″, as illustrated. The spacing between the arms 76″ and 78″ must be sufficient not only to pass the normal towel width of the toweling 14 but also to pass the width as defined at the areas including the magnets 22. The arm 76″ is a permanent magnet as distinguished from the other modifications of the present apparatus. The toweling 14 in passing through the spacing defined between the arms 76″ and 78″ will move in uninterrupted fashion when so magnet 22 passes between the space. When the magnet 22 comes into the vicinity of the magnet arm 76″ the two particules will be engaged by the intermagnetic forces and will cling together to cause the arm 76″ and therethrough the arm 74″ to be carried along with the movement of the towel (the towel being manually removed from the cabinet by the user.)

It should be observed that the toweling 14 employed in a cabinet of the type set forth herein may be used in other continuous towel cabinets. The transverse ridges 20 or 20′ on the toweling 14 preferably are of a different color than the remainder of the towel so that there will be a distinguishable variation therebetween that is readily recognized in use. The cabinet mechanism and towel installation should be provided such that one of the ridges extends to a point just short of the front cabinet opening during each operation. Thus, during the subsequent operation that colored ridge will be withdrawn from the cabinet and the toweling pulled until the stop mechanism (defined herein) limits towel discharge. Discharge of the colored ridge from its cabinet position will identify to the user the beginning of a towel area that is unused. Thus, the distinguishable ridges 20 provide means for identification of clean towel areas for the convenience of the user. Once a clean towel area is identified by the user the need to withdraw additional lengths of toweling from the cabinet will be obviated and total towel usage reduced.

Toweling will vary in dimension according to specifications of the user and type of cabinet. A typical towel may be approximately 11 inches in width and about 50 yards in length. In the apparatus set forth herein the toweling is provided with ridges of greater thickness than the remainder of the towel, said ridges being provided at uniformly spaced intervals along the towel length. The ridges may extend fully across the width of the towel at each position or extend in from the edge of the towel only a short distance as required by the regulating means (set forth below) and the nature of identification of clean towel areas desired.

An arm 84 is affixed to the arm 74 adjacent the pivot point of said arm 74. The arm 84 extends away from said trigger arm 74 and terminates at a point below the floating joint defined by the pivotal connection 72 of the arms 64 and 66. The towel discharge regulating apparatus as illustrated in FIGURE 5 is shown in inoperative position. In this position the toweling 14 may continuously be removed from the cabinet since the towel stop means is not engaged. Without the trigger and stop means set forth herein the towel would be freely removable from the cabinet without restrictions since the action would amount only to unrolling the towel from the clean roll and rerolling the same on the soiled towel roll. As illustrated in FIGURE 5 the seam 20 is below the seam engaging arms and in this position the towel is freely movable.

As shown in FIGURE 6, the seam 20 has been moved up by pulling the towel 14 from the cabinet such that the seam now engages the releasable trigger means. The spring action of the releasable engaging means (in one modification) is sufficient to prevent widening of the spaced members so that the seam 20 is trapped and cannot move therebetween when the towel is continually pulled from the cabinet. Thus, the trigger arm 74 must move upwardly being pulled in said direction by the manual action of pulling the towel and engagement of the seam 20 of the towel 14 with the releasable towel engaging means. As the arm 74 moves upwardly, clockwise in FIGURE 6, the arm 84 strikes the arm 66 in the area below the toggle pivot joint 72 and urges the arms 64 and 66 to move to the left (in FIGURE 6). The arms 64 and 66 no longer are in partially collapsed position as defined in FIGURES 4 and 5 but are straightened to define a slightly longer linear distance between the pivot points 68 and 70. The movement of the arms 64 and 66 under action of the arm 56 upwardly to bring the gear 60 into engagement with the gear 36a of the drive roll 36. In this position rotation of the drive roll 36 and the gear 36a will result in rotation, in unison, of the gear 60 of the towel discharge regulating apparatus. A bar 88 is provided in the wall 18 of the towel discharge cabinet. The arm 74 is adapted to come into abutting engagement with the bar 88 of the cabinet at the bar 74 position representnig full engagement of the gear 60 with the gear 36a of the drive roll. A positive stop for the arm 74 is provided in this manner. When the bar is full against the stop bar 88, continued discharge of the towel from the cabinet will overcome the action of spring 81 tending to hold the clip 79 and arm 78 in seam engaging position. In this manner the clip 79 is forced against the action of the spring 81 to provide clearance between clip 79 and arm 78 for passage of the seam 20. After the seam 20 has passed the spring 81 urges the clip 79 into seam engaging position again spaced approximately .030" from the arm 78 of the apparatus.

The position of the arm 84 in the elevated arm position 74 is shown in dashed lines at 84', FIGURE 6, with the non-operative regulating position being shown by solid lines 84.

Likewise the positions of the arms 64 and 66 in elevated arm position of arm 74 are shown by solid lines 64' and 66' in FIGURE 6, with the static or non-operative regulating position of the arms 64 and 66 being shown by the dashed lines therein.

The stop device set forth herein includes means known to the art and as set forth in U.S. Patent 2,785,034. This device is illustrated in FIGURES 3, 7 and 8. The apparatus includes a stop cam 90 mounted on the shaft 62 of the gear 60. A pin 92 is affixed to the outboard portion of the cam, as shown in FIGURE 8. A link arm 94 is mounted such that the pin 92 extends through a central slot 96 in said arm with the link arm therefore being mounted in eccentric position with respect to the axis of the cam 90. The opposite end of the link arm 94 is pivotally affixed to a vertical slide member 98. The slide member 98 is provided with a base platform 100. The platform 100 receives the upwardly facing suction cup 102. The vertical slide member 98 is vertically guided for up and down movement along the plate 104 which is, in turn, affixed to the side plate 18 of the cabinet. The fixed downwardly faced suction cup 106 is received upon the plate 104, the downwardly facing suction cup being positioned such that it is in vertically aligned relation with the upwardly facing suction cup 102 of the apparatus, as shown in FIGURES 3, 7 and 8. The fixed downwardly facing suction cup 106 is provided with an orifice 110 of adjustable size so that leakage of air may be controlled between the interengaging cups when in such position.

The lower platform 100 of the vertically movable plate 98 is biased toward the "down" position as shown in FIGURES 7 and 8, by the spring 112. As indicated one end of the spring 112 is affixed to the cabinet of the apparatus and the other end of the spring 112 is affixed to the platform 100 of the plate 98. In this manner the spring 112 in attempting to resume its static position and to remain in that position will act as a supplemental resetting force to urge the regulating apparatus to reset and to position itself in the non-operational position.

The platform 100 extends outwardly in direction toward the pivot points defined at 58 and 70 of the regulating apparatus to define a cam 114. A reset arm 116 of generally L-shaped configuration is pivotally attached to the side wall 18 of the cabinet by a pivot pin 118. The long leg of the reset arm 116 extends upwardly and is adapted to engage the arms 64 and 66 to urge them to non-operational position in proper action, as defined hereinbelow. A cam member 120 is adapted to be operatively engaged by the cam 114 of the vertical slide member 98 to precipitate the reset action of the apparatus. The cam 120 is pivotally affixed to the long leg of the L-shaped reset arm 116 by the pin 122. The base of the arm 116 is folded over at 124 to provide positive engagement means for the extending leg 120a of the cam 120.

The action of the reset arm is functionally set forth in FIGURE 9 of the drawings wherein the arm 116 and the arms 64 and 66 are shown in alternate positions. The solid line representations of each of the above noted members represents the non-operational position of the regulating apparatus for the continuous towel discharge cabinet. As illustrated in FIGURE 9, the reset arm 116 will be slightly displaced from its static position when the arms 64 and 66 are in operational position as defined by the dashed line positions 64' and 66'. The arm 116 will assume the position 116' as indicated by the dashed lines. When the cam member 114 is urged downwardly as set forth hereinbelow the cam face thereof will engage the cam face of the cam 120. The leg 120a of the cam 120 is against the stop 124 so that the cam 120 may not rotate away from the descending cam 114. The cam 114 therefore will urge the cam 120 and therethrough the reset arm 116 to the right as indicated in FIGURE 9. The upper terminal portion of the arm 116 will move against the floating joint 72 to cause it to move to the right, as shown in FIGURE 9. The arms 64 and 66 are brought into over-center position when in operative relation drawn between the pins 68 and 70 along the longitudinal axis of the arms 64' and 66' being approximately 5° to the left of center, said center being defined by the line C and extending directly from the pivot pin 70 to the operative position of the pivot pin 68. The over-center positioning of the arms 64 and 66 tends to keep the arms in this position and thus to keep the gear 60 in engagement with the gear 36a of the drive roll. When the cam 114 moves downwardly into engagement with the cam 120 of the arm 116 the cam 114 will cause the arm 116 to move through an angular position of 7°. This 7° movement of the reset arm 116 moves the arms 64 and 66 through the 5° offset position which they assume during operation of the regulatory means of the cabinet and a sufficient distance beyond the center C to assure full collapse of the arms to their solid line positions under the weight of the apparatus.

Operation

The operation of the apparatus set forth hereinabove involves the action and interaction of two distinct operating components, namely, the towel discharge apparatus and the towel discharge regulating apparatus. The towel discharge apparatus is illustrated in FIGURE 2 of the drawings and is described hereinabove. Briefly, the action of the discharge apparatus contemplates manual withdrawal of the towel 14 from the cabinet 12 by pulling the towel in the area of the loop L defined below the cabinet. This action pulls the towel from the clean towel roll 32 up to and partially about the drive roll 36 and over the pinch roll 38 to the opening 16 in the cabinet 12. The pinch roll, as defined hereinabove, is pulled down into "pinching" engagement with the drive roll 36 to pinch the towel therebetween. The drive roll 36 is drivingly interconnected to the takeup roller 42 through the chain drive means defined between the sprocket or gear 36a of the drive roll 36, chain 44 and the sprocket or gear 42a of the roll 42. The takeup roll 42 is drivingly engaged with the soiled towel roll 50. As illustrated, the soiled towel roll is driven at a linear speed equal to the linear speed of discharge of toweling from the clean towel roll so that as much toweling is taken up during each operation as is discharged and the loop L remains substantially constant in size. The smoothing baffle 30 is adapted to place the towel under tension as it is taken up on the soiled towel roll and to even the towel as it passes thereunder to provide means for uniform distribution and take up of the towel on the soiled towel roll of the apparatus.

The operation of the towel discharge regulating mechanism will be explained in conjunction with FIGURES 3, 7 and 8.

If the toweling that is stored in the continuous towel discharge cabinet is of the conventional type, that is, with no thick or raised areas along the towel length, then the toweling could be continuously discharged from the apparatus with no means to limit the amount of toweling removed at any time during operation of the device. The regulating apparatus of the towel cabinet set forth herein is not actuated in the manner normally set forth for apparatus of this type. That is, the conventional towel stop apparatus permits only one revolution of the drive roll, for example, as in the apparatus set forth in Patent 2,785,034, due to the specific construction of the stop means for such cabinets. In accord with this the amount of toweling discharged from continuous towel cabinets with such stop means usually is approximately 8 or 9 inches. Normally a user required more toweling than this and will remove two or three lengths of toweling from the cabinet prior to use. Further, if at any time during use it is desired to change the length of toweling to be removed from the cabinet during any one "pull" or operation of the apparatus it is essential to modify the mechanism to provide larger diameter rolls, larger diameter cams, or some other such arrangement to permit a larger diameter to be traversed by the stop means and thereby to provide a greater linear distance so as to permit more towel to be removed from the cabinet.

Operating of the triggering mechanism and thereby the stop means of the regulating apparatus of the present invention is dependent upon the spacing between the thick areas or seams on the toweling used in the cabinet. To this extent whenever one wishes to change the length of toweling of the apparatus only a towel change will be required, the new towel having different spacings between seams in accord with the modification of towel length removal desired by the user. No change of the construction of the apparatus is required. Regulation of the length initially is independent of the diameter of the rolls or the size of the cam, or the like.

During the initial pull on the towel 14 in removal of toweling from the cabinet 12 the regulating apparatus is in the inoperative position as illustrated in FIGURE 7. The gear 60 of the regulating apparatus will not be lifted into engagement with the gear 36a of the drive roll 36 until forced upwardly into engagement therewith. The toweling is freely removed from the cabinet 12 and the seam 20 of the toweling 14 is brought into abutting engagement with the seam engaging means of the trigger arm 74. As noted hereinabove, the action of the spring 81 is such that it will resist movement of the clip 79 away from the arm 76 during the period that the arm 74 may travel upwardly unimpeded toward the stop post 88 of the apparatus. Continued removal of the toweling 14 from the cabinet 12 will therefor cause the arm 74 to pivot in a blockwise upward direction as shown in FIGURES 3 and 8. Movement of the arm in a clockwise direction brings the arm 84 into abutting engagement with the floating pivot joint 72. Continued movement of the arm 74 in a clockwise direction and therethrough the arm 84 will force the floating pivot 72 and the arms 64 and 66 into operative position as indicated in FIGURES 3 and 8 and by the solid lines 64' and 66' in FIGURE 6. As set forth above the arms 64 and 66 are pushed slightly beyond the center position into over-center relation so that they will be "locked" in operative position when the arm 74 strikes the stop bar 88 thereby limiting continued upward movement of said arm 74.

Continued manual withdrawal of the toweling 14 from the cabinet will force the releasable seam engaging means to spread a sufficient distance to permit the seam 20 to pass between said arms and toward the drive roll 36. The clip 79 is immediately reset by the spring 81 for engagement by the next seam 20 of the toweling.

Movement of the arms 64 and 66 to operative position urges the pivot arm 56 upwardly, as shown in FIGURES 3 and 8, thereby to bring the gear 60 into meshing engagement with the gear 36a of the drive roll 36. The toweling 14 is continually being removed from the cabinet during this interval so that engagement of the gear 60 with gear 36a will cause the gear 60 to rotate in unison with rotation of the gear 36a of the apparatus.

Rotation of the gear 60 will cause the cam 90, attached thereto, to rotate therewith. The gear 60 will, of course, rotate about its axis in counterclockwise direction in FIGURES 3 and 8, thereby causing counterclockwise directional rotation of the cam 90 about its axis. Rotation of the cam 90 will move the pin 92 upwardly within the slot 96 of the slide 94 until the pin is at the upper terminal of the slot 96. When the pin reaches the upper terminal of the slot 96 it will begin to pull the slide 94 along with it in its travel about axis 62. When the cam has rotated through slightly more than 180° from its rest position it will have moved the slide 94 to its upper terminal of travel. The slide 94, as hereinabove described, is pivotally connected to the vertically movable plate 98. Upward movement of the slide 94 will cause the plate 98 to move upwardly in unison with said slide. When the cam has brought the slide to its upper terminal of travel the plate 98 will have brought the lower suction cup 102 into full suction engagement with the upper suction cup 106. The cups will be in collapsed engagement in this position of the apparatus and will define a low pressure area therebetween with the differential pressure between the outer surface and inner surface of the cups tending to hold the cups in engaged relation.

As the cam continues to rotate, now in a downward direction from its uppermost point of travel the stop bar 99 will engage the stop face 101 of the vertically movable plate 98. This will prevent further rotation of the cam 90 and therethrough the shaft 62 to which the cam is affixed. When the shaft 62 is prevented from rotating it, in turn, places locking force on gear 60 to stop rotation of the gear 60. With the gear 60 locked in position the drive roll 36a cannot rotate and thereby the removal of toweling 14 from the cabinet 12 is stopped. The towel discharge apparatus is fully locked at this point and no further movement can occur as long as the vertically movable plate 98 is in the full up position. The vertically movable plate 98 is held in the up position by the engagement of the suction cups 102 and 106 of the apparatus. As noted hereinabove, the cup 106 is provided with an adjustable orifice 110 so as to provide a slow rate leak to the inner area defined between the suction cups. This rate of leak can be adjusted simply by rotating the cap of the orifice 110 to open or close the opening defined thereby. The rate usually is defined such that only a few seconds will elapse from the time the bar 99 of the cam 90 hits the stop face 101 of the plate 98. The time of the delay is not important, the most important aspect being the full stop and sufficient delay to assure that continued withdrawal of the towel will be fully interrupted.

When the suction is broken between the suction cups 102 and 106 the cups will part and the action of the spring 112 affixed to the lower platform 100 of the vertically movable plate 98 will bias the plate 98 to its static, full down, position where the spring tension will be relieved and the plate will be against its bottom stop against the cabinet support.

When the plate moves to its full down position, shown in FIGURES 3 and 8, the cam 114 strikes the cam 120 of the reset arm 116. Engagement of the cams 114 and 120 will move the reset arm 116 to the right, clockwise in FIGURES 3 and 8.

The upper portion of the reset arm 116, in moving to the right, will strike the floating joint area defined at 72 and will force it to the right in unison with the reset arm. Total movement of the reset arm 116 need be sufficient only to move the floating joint over-center, as defined hereinabove. It should be observed that the weight of the regulating apparatus asociated with the arms 64 and 66 will cause said arms to collapse to the position shown in FIGURES 7 and 9 of the drawings, ready for the next regulating action. The apparatus now is fully restored to non-operative position.

It should be noted that when the cam 114 moves upwardly with the plate 98 during upward travel of said plate it will strike the cam 120. No movement of the reset arm 116 occurs during this interval of action since the cam 120 rotates about its pivot to permit the cam 114 to pass by.

Thus, a means is provided whereby toweling may be continuously removed from a cabinet until the regulating means is triggered by the seam, or the like, on the towel itself. Once the regulating means has been triggered only a predetermined amount of toweling will continue to be discharged before the operating mechanism of the discharge means is locked to prevent further withdrawal of toweling until a predetermined time interval has elapsed and the apparatus is fully reset.

The modified towel discharge apparatus is shown in FIGURES 10 through 12. The above noted modification operates in much the same manner and with the same towel discharge apparatus as the regulating apparatus set forth and defined hereinabove.

Similar parts of this modified apparatus are identified with the numerals of the apparatus illustrated in FIGURES 1 to 9 with the number 200 added to each.

It can readily be seen that the toweling 214 is discharged from the apparatus in the same manner as set forth above in that it is passed from the clean towel roll (not shown in these figures) partially over the drive roll 236, over the pinch roll 238 and then externally of the cabinet 212 to the soiled towel roll 250. The same general type of toweling and operation in combination with said towel is employed in a cabinet with the modified type of regulating apparatus in that the regulating apparatus is placed in operative position only when a thick seam 220 engages in abutting relation the arms 273 and 276 of the trigger apparatus.

Toweling 214 may initially be manually discharged from the apparatus in the same manner as set forth in discussion of the embodiment of FIGURES 1 through 9 with free discharge being permitted until the regulating apparatus is moved to operative position and engaged to stop removal of toweling. The seam 220 of the toweling is adapted to be brought into abutting engagement with the clip 279 and arm 278 of the trigger arm 340 of the apparatus to move the arm 340 clockwise as shown in FIGURES 10 and 11. When the arm 340 is moved in a clockwise direction the arms 264 and 266 are removed to over-center relation as indicated in FIGURE 11, the weight of the regulating apparatus then serving to lock the apparatus in operative position and to keep the arms 264 and 266 in over-center relation. The gear 260, as illustrated in FIGURE 11, is brought into meshing interengagement with the gear 236a of the drive roll 236 thereby causing the gear 260 to rotate in unison with the gear 236a of said drive roll.

Rotation of the gear 260 will cause the cam 290 affixed on a common shaft 262 to rotate. The pin 292 on the cam 290 will ride in the slot 296 of the slide 294. The slide 294 will be moved upwardly as the cam 290 rotates to cause the vertically movable plate member 298 to move upwardly therewith, the plate 298 being pivotally interconnected to the slide 294. As the cam 290 continues to move around in unison with rotation of the gear 260 the plate 298 is pulled, through the slide 294, to its upper terminal position at which time the lower suction cup 302 is brought into suction engagement with the upper suction cup 306 to hold the plate 298 locked in elevated position, as shown in FIGURE 11. As the cam 290 continues to rotate with the shaft 262, the stop face 299, FIGURE 10, will move into abutting engagement with the stop face 301 of the plate 298 to cause the cam 290 to stop rotating and thereby to lock the towel discharge apparatus through the gear 260 and the drive roll gear 236a, as set forth hereinabove in conjunction with the embodiment of FIGURES 1 through 9.

The orifice 310 is adjusted to permit air leakage between the suction cups 302 and 306 at a predetermined rate to hold the apparatus in locked position long enough fully to interrupt continuous discharge of the toweling 214 from the cabinet. When the pressure within the area defined between the suction cups is equalized with the pressure outside thereof, taking into consideration the pull exerted by the spring 312 acting upon the platform 300 and therethrough upon the lower suction cup 302, the lower cup will drop away from engagement with the upper cup 306 and will be urged by the spring to its full down position as shown in FIGURE 10. The cam 314 of the plate 298 will move into engagement with the back face of the cam 317 of reset arm 316, as shown in FIGURE 12b to move the reset arm 316 clockwise, as shown, and to bring the upper portion of the reset arm into engagement with the floating pivot arm 272. The interengagement of the cam members 314 and 317 will force the reset arm 316 to move the joint 272 to the right and past its center position. The weight of the regulating apparatus will then act to force the arms 264 and 266 into collapsed relation, as indicated in FIGURE 10 of the drawings, ready for the next operation.

The cam faces 314 and 317 as shown in FIGURE 12c are provided such that the cam 314 will ride on the outer surface of the cam member 317 to cause the cam 316 to rotate counterclockwise as seen in FIGURE 11. The cam 314 is generally L-shaped at the upper terminal thereof to define a projecting flange thereon, as seen in the fragmentary view of FIGURE 12c. The cam 314 projects inwardly toward the main body section of the cam 316 and when the cam 314 is above the upper terminal of the cam member 317 it will be disposed toward the inner face of said cam 317. When the member 314 moves downwardly during the reset action of the apparatus the flange of the cam 314 will pass along the inner face of the cam member 317 to cause the reset arm 316 to move in a clockwise direction thereby to engage the floating pivot defined at 72 and to reset the arms 64 and 66 to non-operative position.

The seams 20 of the toweling 14 may be of different colored material or simply a distinguishable area thereby to provide positive identification for the user of the clean area and the soiled area. The toweling and apparatus combination are arranged such that, in use, a seam 20 will be disposed just within the cabinet by the opening 16 thereof so that when it is withdrawn from the cabinet up to the next seam position the clean area will be positively distinguishable and the user will not be required to "guess" where the soiled toweling ends and the clean toweling begins.

While a specific embodiment of the present invention is shown and described it will, of course, be understood that other modifications and alternative constructions may be used without departing from the true spirit and scope of the invention. It is intended by the appended claims to cover all such modifications and alternative constructions as fall within their true spirit and scope.

What we claim as new and desire to secure by Letters Patent of the United States, is:

1. A continuous towel dispensing apparatus adapted to dispense an elongated towel, said apparatus comprising:

a housing;

dispensing means mounted on said housing and adapted to receive the elongated towel and to release the same from one point and to take it up from a point horizontally spaced thereof, thus forming a depending towel loop in normal operation, said towel having spaced indicia thereon; and operating means operatively associated with said dispensing means and mounted on the housing, said operating means including continuous towel discharge means and towel discharge regulating means, said towel discharge regulating means being alternately isolated from and drivingly connected to said continuous towel discharge operating means in response to passage of said towel indicia thereby to permit regulation of the amount of toweling that may be removed from the apparatus.

2. A towel dispensing apparatus comprising, in combination:
   a housing;
   an elongated towel having a plurality of raised seams thereon at spaced intervals along the towel length, each of said seams being distinguishable in form from the remainder of the elongated towel; and
   dispensing means mounted on said housing and receiving the elongated towel and to release the same from one point and to take it up from a point spaced thereof, said dispensing means including continuous towel discharge means and towel discharge regulating means, said continuous towel discharge means capable of continuously discharging the toweling from said dispensing means, said regulating means being alternately isolated from and operatively connected to said continuous towel discharge operating means, said regulating means when connected to said continuous towel discharge means effective to interrupt the continuous operation thereof for a predetermined time interval in response to passage of a raised seam thereby.

3. A towel dispensing apparatus comprising, in combination:
   a housing;
   an elongated towel having a plurality of actuating means thereon at uniformly spaced intervals along the towel length;
   dispensing means mounted on said housing and adapted to receive the elongated towel and to release the same from one point and to take it up from a point horizontally spaced thereof, thus forming a depending towel loop in normal operation; and,
   operating means operatively associated with said dispensing means and mounted on the housing, said operating means including continuous towel discharge means and towel discharge regulating means, said towel discharge regulating means being alternately isolated from and drivingly connected to said continuous towel discharge operating means, the regulating means being responsive to passage of the towel actuating means to bring the regulating means into driving engagement with the continuous towel discharge operating means, and to permit regulation of the amount of toweling that may be removed from the apparatus.

4. A towel dispensing apparatus comprising, in combination:
   a housing defining a towel receiving cabinet, said housing having a pair of spaced openings therein through which toweling may pass;
   an elongated towel having a plurality of raised seams thereon at uniformly spaced intervals along the towel length, said seams being distinguishable in form from the remainder of the elongated towel;
   dispensing means mounted in said housing and adapted to receive the elongated towel and to release the same from one point and to take it up from a point horizontally spaced thereof, thus forming a depending towel loop defined externally of said cabinet between said spaced openings therein; and,
   operating means associated with said dispensing means and mounted on the housing, said operating means including continuous towel discharge means and towel discharge regulating means, said towel discharge regulating means being alternately isolated from and drivingly connected to said continuous towel discharge operating means, the regulating means being responsive to each passage of the towel seam to bring said regulating means into operative engagement with the continuous towel discharge operating means, said regulating means when in engagement with said continuous towel discharge means effective to lock the continuous towel discharge operating means to interrupt the continuous operation thereof for a predetermined time interval.

5. A towel dispensing apparatus comprising, in combination:
   a housing;
   an elongated towel having a plurality of raised seams thereon at uniformly spaced intervals along the towel length, said seams being distinguishable in form from the remainder of the elongated towel;
   dispensing means mounted on said housing and adapted to receive the elongated towel and to release the same from one point and to take it up from a point horizontally spaced thereof, thus forming a depending towel loop in normal operation; and,
   operating means operatively associated with said dispensing means and mounted on the housing, said operating means including continuous towel discharge means and towel discharge regulating means, said towel discharge regulating means being alternately isolated from and drivingly connected to said continuous towel discharge operating means, the regulating means being responsive to each passage of a towel seam to bring said regulating means into operative engagement with the continuous towel discharge operating means, said regulating means when in engagement with said continuous towel discharge means effective to lock the continuous discharge means for a predetermined time interval thereby to interrupt the continuous discharge of toweling from the cabinet, said regulating means having reset means to automatically reposition said regulating means in position out of engagement with the continuous towel discharge means after the passage of said predetermined time interval ready for the passage of the next towel seam on the elongated towel.

6. A towel dispensing apparatus comprising, in combination:
   a housing;
   an elongated towel having a plurality of transverse ridges thereon at uniformly spaced intervals along the towel length, said ridges being distinguishable in form from the remainder of the elongated towel;
   dispensing means mounted on said housing and adapted to receive the elongated towel and to release the same from one point and to take it up from a point spaced thereof, thus forming a towel loop in normal operation;
   continuous towel discharge means operatively associated with said dispensing means, said continuous discharge means adapted to permit continuous uninterrupted discharge of toweling from said dispensing means; and,
   towel discharge regulating means adapted to be disposed in operative and in non-operative positions during use, the non-operative position thereof being defined when said regulating means is out of engagement with said continuous towel discharge means, the operative position being defined when said regulating means is in operative engagement with said continuous towel discharge means, the regulating means being responsive to the passage of each towel ridge to move said regulating means into operative engagement with said continuous towel discharge means, said regulating means when in engagement with said continuous discharge means effective to lock the continuous discharge means after the passage of a predetermined length of towel thereby, said regulating means adapted to sustain said locked condition for a predetermined time interval to interrupt operation of the continuous towel discharge means and thereby to interrupt discharge of toweling from the apparatus.

7. A towel dispensing apparatus comprising, in combination:
   a housing;
   an elongated towel having a plurality of transverse ridges thereon at spaced intervals along the towel length;
   dispensing means mounted on said housing and adapted to receive the elongated towel and to release the same from one point and to take it up from a point spaced thereof, thus forming a towel loop between said points in normal operation;
   continuous towel discharge means operatively associated with said dispensing means, said continuous discharge means adapted to permit continuous uninterrupted discharge of toweling from said dispensing means; and,
   towel discharge regulating means adapted to be disposed in operative and in non-operative positions during use, the non-operative position thereof being defined when said regulating means is out of engagement with said continuous towel discharge means, the operative position being defined when said regulating means is in operative engagement with said continuous towel discharge means, the regulating means being responsive to the passage of each towel ridge therepast to move said regulating means into operative engagement with said continuous towel discharge means, said regulating means when in engagement with said continuous discharge means effective to lock the continuous discharge means after the passage of a predetermined length of towel thereby, said regulating means adapted to sustain said locked condition for a predetermined time interval to interrupt operation of the continuous towel discharge means and thereby to interrupt discharge of toweling from the apparatus, said regulating means having reset means operatively associated therewith and adapted at the termination of said predetermined time interval to reposition the regulating means to the non-operative position.

8. A towel dispensing apparatus comprising, in combination:
   a housing;
   an elongated towel having a plurality of transverse ridges thereon at spaced intervals along the towel length;
   dispensing means mounted on said housing and adapted to receive the elongated towel and to release the same from one point and to take it up from a point spaced thereof, thus forming a towel loop between said points in normal operation;
   continuous towel discharge means operatively associated with said dispensing means, said continuous discharge means adapted to permit continuous uninterrupted discharge of toweling from said dispensing means; and,
   towel discharge regulating means adapted alternately to be disposed in one of two positions during use, one position thereof being defined when said regulating means is out of engagement with the continuous towel discharge means, the other position thereof being defined when said regulating means is in operative engagement with said continuous towel discharge means, the regulating means being responsive to the passage of each towel ridge thereby to move said regulating means into operative engagement with said continuous towel discharge means, said regulating means when in engagement with said continuous discharge means effective to lock the continuous discharge means, said regulating means adapted to sustain said locked condition for a predetermined time interval to interrupt operation of the continuous towel discharge means and thereby to interrupt discharge of toweling from the apparatus.

9. A towel dispensing apparatus comprising, in combination:
   a housing;
   an elongated towel having a plurality of transverse ridges thereon at spaced intervals along the towel length;
   dispensing means mounted on said housing and adapted to receive the elongated towel and to release the same from one point and to take it up from a point spaced thereof, thus forming a towel loop between said points in normal operation;
   continuous towel discharge means operatively associated with said dispensing means, said continuous discharge means adapted to permit continuous uninterrupted discharge of toweling from said dispensing means; and,
   towel discharge regulating means adapted alternately to be disposed in one of two positions during use, one position thereof being defined when said regulating means is out of engagement with the continuous towel discharge means, the other position thereof being defined when said regulating means is in operative engagement with said continuous towel discharge means, the regulating means being responsive to the passage of each towel ridge thereby to move said regulating means into operative engagement with said continuous towel discharge means, said regulating means when in engagement with said continuous discharge means effective to lock the continuous discharge means, said regulating means adapted to sustain said locked condition for a predetermined time interval to interrupt operation of the continuous towel discharge means and thereby to interrupt discharge of toweling from the apparatus, said regulating means having reset means operatively associated therewith and adapted at the termination of said predetermined time interval to reposition the regulating means to non-operative position.

10. A towel dispensing apparatus comprising, in combination:
    a housing;
    a hygroscopic fabric defining a towel of belt-like configuration and having ridges thereon at uniformly spaced intervals therealong, said ridges each being distinguishable from the remainder of the belt-like towel thereby to provide means for identification of adjacent towel areas;
    dispensing means mounted on said housing and adapted to receive the towel and to release the same from one point and to take it up from a point spaced thereof, thus forming a towel loop between said points in normal operation;
    continuous towel discharge means operatively associated with said dispensing means, said continuous discharge means adapted to permit continuous uninterrupted discharge of toweling from said dispensing means; and
    towel discharge regulating means adapted alternately to be disposed in one of two positions during use, one position thereof being defined when said regulating means is out of engagement with the continuous towel discharge means, the other position thereof being defined when said regulating means is in operative engagement with said continuous towel discharge means, the regulating means being responsive to the passage of each towel ridge thereby to move said regulating means into operative engagement with said continuous towel discharge means, said regulating means when in engagement with said continuous discharge means effective to lock the continuous discharge means, said regulating means adapted to sustain said locked condition for a predetermined time interval to interrupt operation of the continuous towel discharge means and thereby to interrupt discharge of toweling from the apparatus, said regulating means having reset means operatively associated therewith and adapted at the termination of said predetermined time interval to reposition the regulating means to non-operative position.

11. A continuous towel apparatus for dispensing toweling comprising, in combination:
   a cabinet;
   dispensing means mounted in said cabinet and adapted to receive the toweling;
   operating means for said dispensing means including a drive roll, said drive roll adapted to be rotated by passage of toweling thereby said drive roll having a gear affixed to one terminal thereof;
   regulating means including a drive gear, said drive gear being pivotally mounted on a pivot arm, said pivot arm operative between two positions, one position defining non-operative position wherein the drive gear is spaced from the gear on the drive roll, the other position being operative position wherein the drive gear and drive roll gear are in interengaging meshing relation; and,
   reset means mounted on said cabinet and adapted to urge said regulating means from operative to non-operative position, said reset means being operably connected to the drive gear of said regulating means and to reset the regulating means to non-operative position once during each revolution of the drive gear.

12. A continuous towel apparatus for dispensing toweling from a towel cabinet of the type where the towel movably extends continuously from a first roll within the cabinet, through an opening in the front of the cabinet, in a loop below the cabinet and then back into the cabinet through a second opening therein to be rewound upon a second roll, said apparatus comprising, in combination:
   dispensing means mounted in said cabinet and adapted to receive the toweling;
   operating means for said dispensing means including a drive roll and take-up roll, said drive roll adapted to be rotated by passage of toweling thereover as said toweling moves from the first roll in its continuous passage, said take-up roll adapted to frictionally engage the second roll and to drive the same thereby, the drive roll and take-up rolls being drivingly interconnected so that rotation of one is reflected in the other, said drive roll having a gear affixed to one terminal thereof;
   regulating means including a drive gear, said drive gear being pivotally mounted on a pivot arm, said pivot arm operative between two positions, one position defining non-operative position wherein the drive gear is spaced from the gear on the drive roll, the other position being operative position wherein the drive gear and drive roll gear are in interengaging meshing relation; and,
   reset means mounted on said cabinet and adapted to urge said regulating means from operative to non-operative position, said reset means being operably connected to the drive gear of said regulating means and to reset the regulating means to non-operative position once during each cycle of said drive gear.

13. A towel dispensing apparatus comprising, in combination:
   a housing;
   an elongated towel having a plurality of raised seams thereon at spaced intervals along the towel length, each of said seams being distinguishable in form from the remainder of the elongated towel;
   dispensing means mounted on said housing and adapted to receive the elongated towel and to release the same from one point and to take it up from a point spaced thereof, said dispensing means including continuous towel discharge means and towel discharge regulating means, said continuous towel discharge means adapted to permit continuous discharge of toweling from said dispensing means, said regulating means being alternately isolated from and operatively connected to said continuous towel discharge operating means, said regulating means including releasable towel seam engaging means adapted to bring the regulating means into operative position upon engagement of a towel seam with said releasable means and to release said seam when the regulating means is brought into said operative position, said regulating means when operatively connected to said continuous towel discharge means effective to interrupt the continuous operation thereof for a predetermined time interval.

14. A continuous towel apparatus for dispensing toweling comprising, in combination:
   a cabinet;
   an elongated towel having a plurality of raised seams thereon at spaced intervals along the towel length;
   dispensing means mounted in said cabinet and adapted to receive the toweling;
   operating means for said dispensing means including a drive roll, said drive roll adapted to be rotated by passage of toweling thereby said drive roll having a gear affixed to one terminal thereof;
   regulating means including a drive gear, said drive gear being pivotally mounted on a pivot arm, said pivot arm operative between two positions, one position defining non-operative position wherein the drive gear is spaced from the gear on the drive roll, the other position being operative position wherein the drive gear and drive roll gear are in interengaging meshing relation; said regulating means including releasable towel seam engaging means adapted to orient the regulating means into operative position upon engagement of a towel seam with said releasable means and to release said towel seam when the regulating means is brought into operative position;
   reset means mounted on said cabinet and adapted to urge said regulating means from operative to non-operative position, said reset means being operably connected to the drive gear of said regulating means and to reset the regulating means to non-operative position once during each revolution of the drive gear.

References Cited in the file of this patent

UNITED STATES PATENTS

| | | |
|---|---|---|
| 1,371,755 | Gilcrest | Mar. 15, 1921 |
| 2,107,790 | Harvey | Feb. 8, 1938 |
| 2,785,034 | Preston | Mar. 12, 1957 |